(12) United States Patent  (10) Patent No.: US 8,177,276 B2
Edwards  (45) Date of Patent: May 15, 2012

(54) VEHICLE BED EXTENDER ASSEMBLY

(75) Inventor: David Edwards, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 322 days.

(21) Appl. No.: 12/481,298

(22) Filed: Jun. 9, 2009

(65) Prior Publication Data
US 2010/0308613 A1 Dec. 9, 2010

(51) Int. Cl.
B60P 3/07 (2006.01)
B60R 9/06 (2006.01)
B62D 33/02 (2006.01)

(52) U.S. Cl. .................. 296/26.08; 224/405; 296/37.6; 410/4

(58) Field of Classification Search .............. 224/402, 224/403, 404, 405; 296/26.01, 26.08, 37.6, 296/39.2; 248/354.1; 410/2, 3, 4, 24, 81, 410/89, 143, 144, 145, 149, 151
See application file for complete search history.

(56) References Cited

U.S. PATENT DOCUMENTS

| 97,808 | A |   | 12/1869 | Powell |   |
|---|---|---|---|---|---|
| 2,806,735 | A |   | 9/1957 | Smith |   |
| 2,974,931 | A | * | 3/1961 | Reel et al. | 410/128 |
| 3,032,217 | A | * | 5/1962 | Musson et al. | 254/3 R |
| 3,062,157 | A | * | 11/1962 | Woods | 410/149 |
| 3,711,882 | A |   | 1/1973 | Iller |   |
| 4,398,763 | A | * | 8/1983 | Louw | 296/3 |
| 4,650,383 | A | * | 3/1987 | Hoff | 410/149 |
| 4,718,583 | A | * | 1/1988 | Mullican | 224/404 |
| 4,737,056 | A | * | 4/1988 | Hunt | 410/151 |
| 4,772,165 | A | * | 9/1988 | Bartkus | 410/139 |
| 4,834,599 | A | * | 5/1989 | Gordon et al. | 410/151 |
| 4,950,123 | A |   | 8/1990 | Brockhaus |   |
| 4,990,049 | A | * | 2/1991 | Hargrove | 414/537 |
| 5,018,918 | A | * | 5/1991 | Jacobs et al. | 410/145 |
| 5,052,878 | A | * | 10/1991 | Brockhaus | 414/522 |
| 5,064,335 | A | * | 11/1991 | Bergeron et al. | 414/522 |
| 5,104,269 | A | * | 4/1992 | Hardison | 410/149 |
| 5,143,415 | A | * | 9/1992 | Boudah | 296/3 |
| 5,338,136 | A |   | 8/1994 | Hetchler |   |
| 5,433,566 | A |   | 7/1995 | Bradley |   |
| 5,435,616 | A | * | 7/1995 | Corner | 296/180.1 |
| 5,553,762 | A | * | 9/1996 | Brown | 224/403 |
| 5,685,594 | A |   | 11/1997 | Harper |   |
| 5,752,800 | A |   | 5/1998 | Brincks et al. |   |
| 5,813,647 | A | * | 9/1998 | Chen | 248/354.7 |

(Continued)

FOREIGN PATENT DOCUMENTS

JP 03148488 A * 6/1991

Primary Examiner — Glenn Dayoan
Assistant Examiner — Paul Chenevert
(74) Attorney, Agent, or Firm — Rankin Hill & Clark LLP

(57) ABSTRACT

A bed extender assembly for a vehicle bed includes at least one bed extender device having a longitudinal length greater than a length of the vehicle bed. The at least one bed extender device has a first end disposed in the vehicle bed and a second end spaced apart from the first end to define the longitudinal length. The second end is spaced rearwardly apart from a rearward end of the vehicle bed. A locking bar extends transversely across the vehicle bed adjacent the first end to lock the first end of the at least one bed extender device against the bed floor.

11 Claims, 8 Drawing Sheets

U.S. PATENT DOCUMENTS

| | | | |
|---|---|---|---|
| D399,468 S | 10/1998 | Lund et al. | |
| 5,816,637 A | 10/1998 | Adams et al. | |
| 5,823,597 A | 10/1998 | Anderson | |
| 5,857,724 A | 1/1999 | Jarman | |
| 5,876,086 A | 3/1999 | Lagrou et al. | |
| 5,893,597 A * | 4/1999 | Rider | 296/37.6 |
| 5,924,835 A * | 7/1999 | Ross | 414/462 |
| 5,934,863 A | 8/1999 | Beck | |
| 5,971,685 A * | 10/1999 | Owens | 410/151 |
| 6,019,265 A * | 2/2000 | Deloza | 224/405 |
| 6,019,410 A | 2/2000 | Trostle et al. | |
| 6,179,181 B1 * | 1/2001 | Johnson et al. | 224/405 |
| 6,186,715 B1 * | 2/2001 | Oliviero | 410/151 |
| 6,227,593 B1 * | 5/2001 | De Valcourt | 296/26.08 |
| 6,238,154 B1 * | 5/2001 | DaPrato | 410/151 |
| 6,279,980 B1 | 8/2001 | Straschewski | |
| 6,312,034 B1 | 11/2001 | Coleman, II et al. | |
| 6,328,366 B1 | 12/2001 | Foster et al. | |
| 6,340,190 B1 | 1/2002 | Rosebrugh et al. | |
| 6,378,926 B1 | 4/2002 | Renze et al. | |
| 6,471,455 B2 | 10/2002 | Skiba | |
| 6,491,331 B1 * | 12/2002 | Fox | 296/26.09 |
| 6,513,688 B2 | 2/2003 | Kmita et al. | |
| 6,524,043 B2 * | 2/2003 | Earle et al. | 410/130 |
| 6,533,337 B1 * | 3/2003 | Harshman et al. | 296/26.08 |
| 6,536,822 B1 | 3/2003 | Vagedes et al. | |
| 6,682,114 B1 | 1/2004 | Cox | |
| 6,733,220 B2 * | 5/2004 | Brown et al. | 410/151 |
| 6,827,533 B2 * | 12/2004 | Cano-Rodriguez et al. | 410/128 |
| 6,830,418 B2 * | 12/2004 | Keramidis | 410/38 |
| 6,834,786 B2 * | 12/2004 | Hansen | 224/403 |
| 6,883,849 B2 * | 4/2005 | Hebert | 296/26.09 |
| 6,921,492 B2 | 7/2005 | De Gaillard | |
| 7,021,689 B1 | 4/2006 | Weisbeck, III | |
| 7,237,817 B2 | 7/2007 | Kobylski et al. | |
| 7,246,731 B1 * | 7/2007 | Matherne, Sr. | 224/403 |
| 7,347,653 B1 * | 3/2008 | Roberts | 410/3 |
| 7,377,563 B1 | 5/2008 | Demick | |
| 7,381,019 B1 | 6/2008 | Boice | |
| 7,699,373 B2 | 4/2010 | Miller | |
| 2002/0109367 A1 | 8/2002 | Terrusa | |
| 2002/0153397 A1 * | 10/2002 | Sutton | 224/405 |
| 2003/0141733 A1 | 7/2003 | Burg | |
| 2004/0062629 A1 * | 4/2004 | Kelly | 414/462 |
| 2005/0161964 A1 | 7/2005 | Adleman, Jr. | |
| 2006/0125267 A1 | 6/2006 | Stevenson et al. | |
| 2006/0226673 A1 | 10/2006 | Miller | |
| 2007/0090661 A1 | 4/2007 | Shagbazyan | |
| 2007/0210599 A1 | 9/2007 | Arnold | |
| 2008/0265603 A1 * | 10/2008 | Bluhm | 296/37.6 |

* cited by examiner

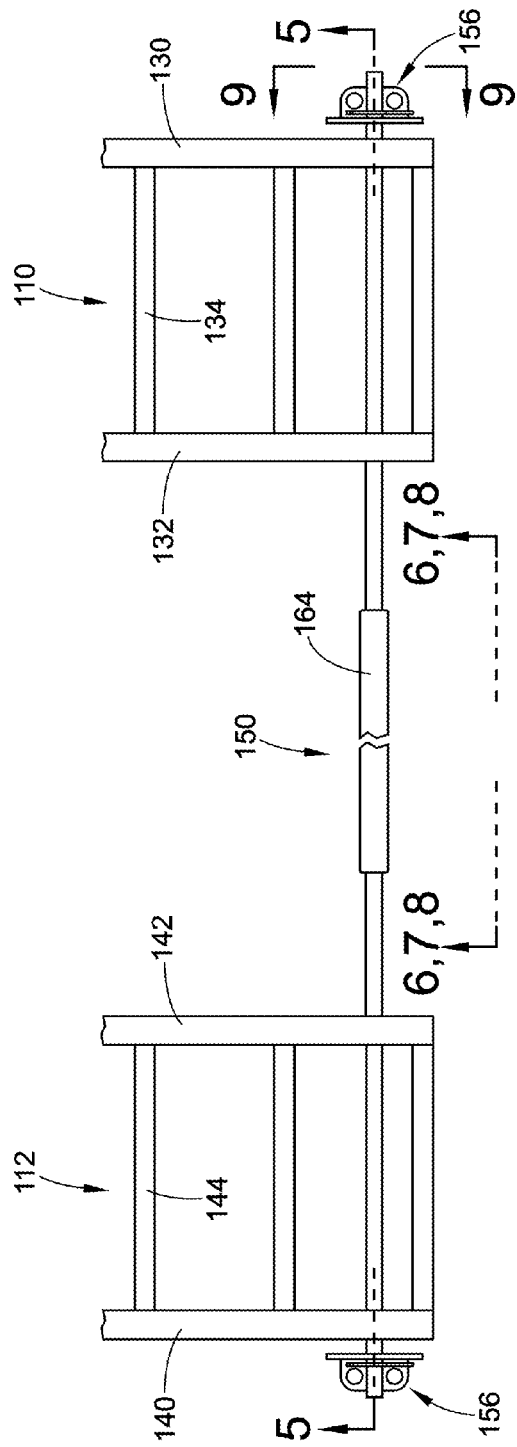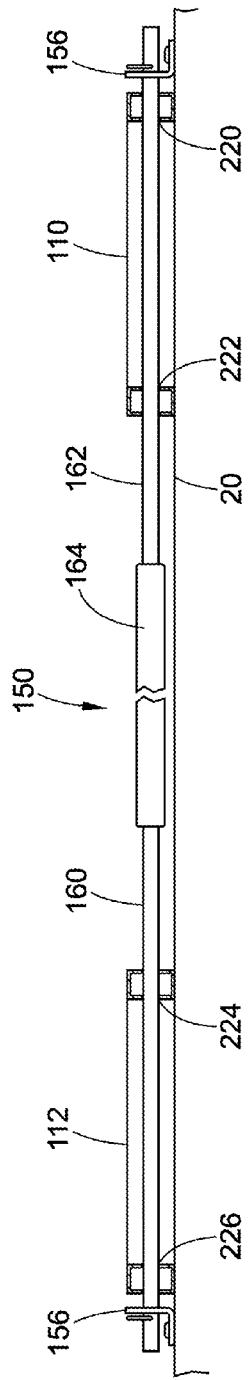

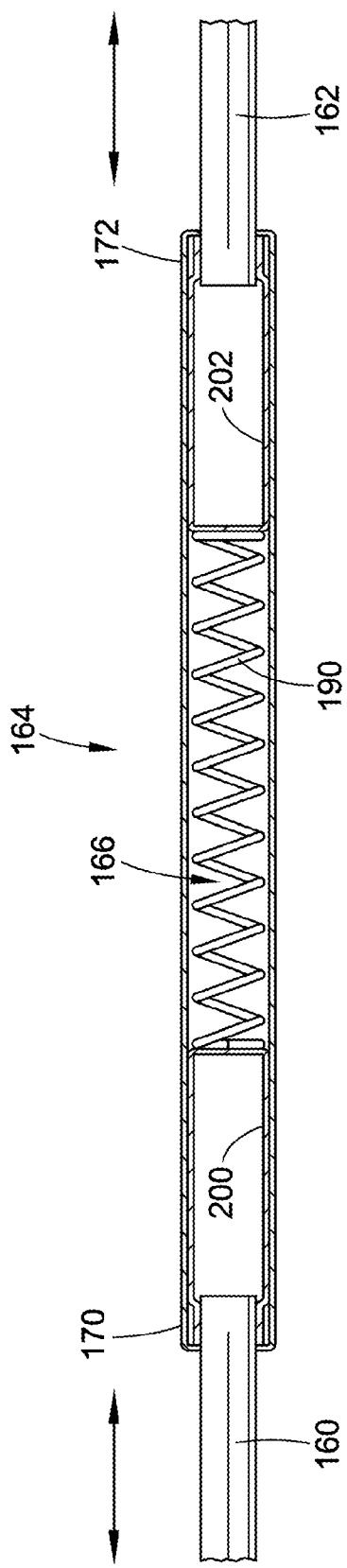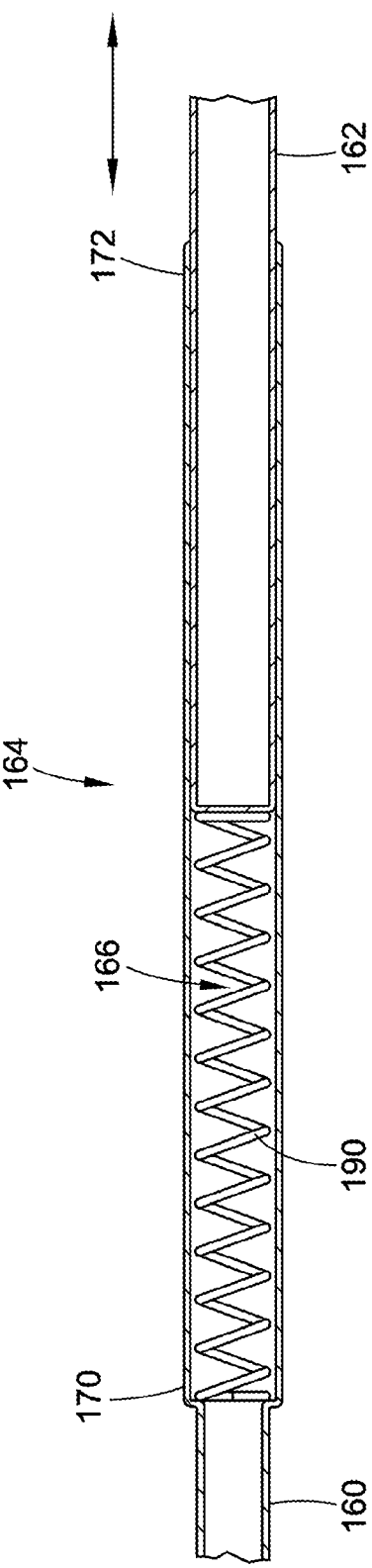

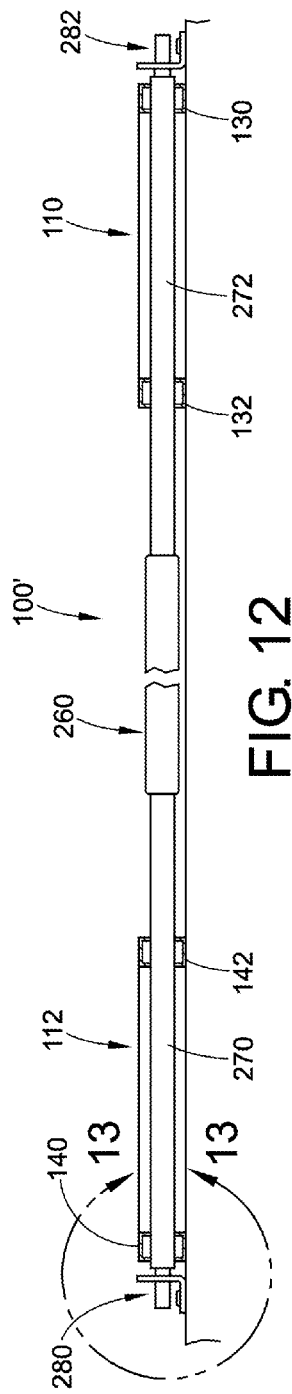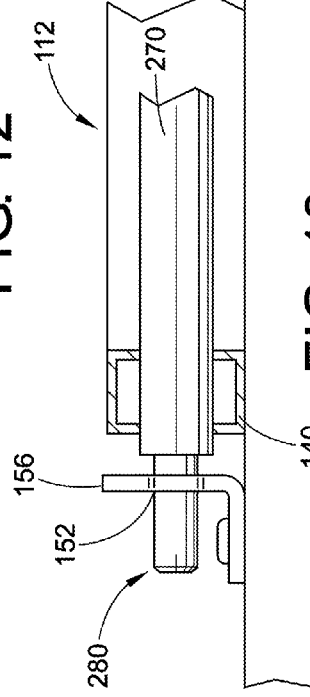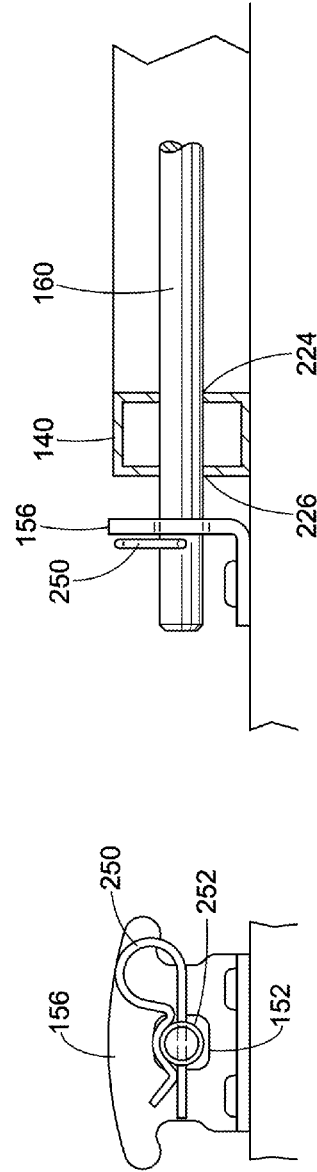

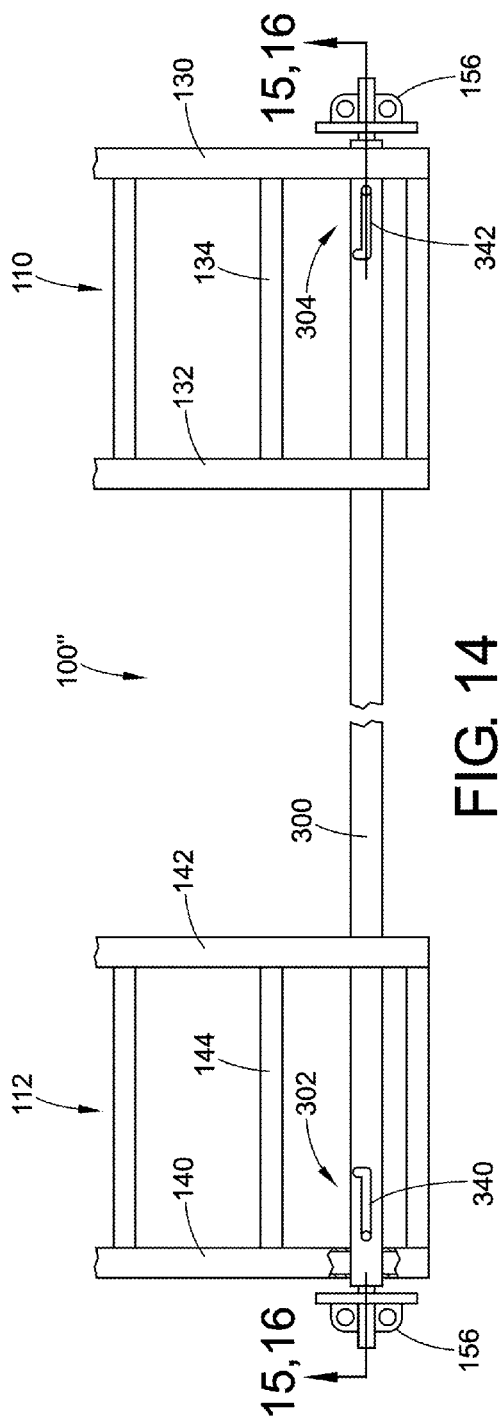
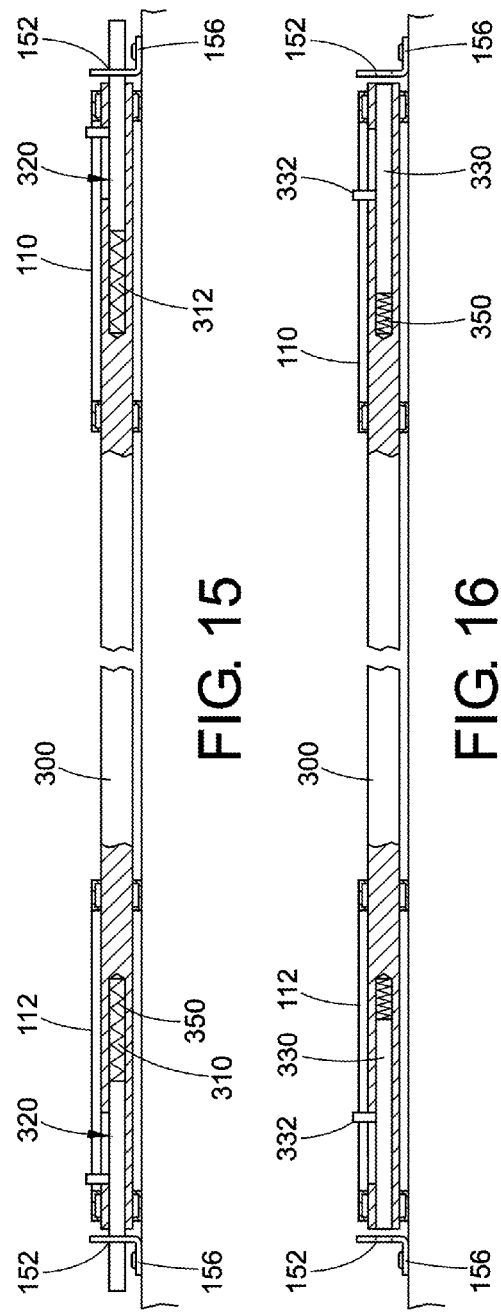
FIG. 14
FIG. 15
FIG. 16

VEHICLE BED EXTENDER ASSEMBLY

BACKGROUND

Exemplary embodiments herein generally relate to a vehicle bed extender device for increasing the carrying capacity of a cargo bed beyond the bed area.

A device attachable to a load carrying bed or frame of a vehicle, such as a pickup truck or the like, in order to increase the load carrying capacity of the load carrying bed is known. However, the known bed extenders suffer several problems. For example, many of the known bed extenders attach to the tailgate of the vehicle to provide the extended load carrying capacity. However, the additional weight of an extended length load is preferably spread uniformly across the load carrying bed and/or the vehicle frame, rather than on the tailgate of the vehicle. This is because the tailgate generally cannot provide the desired structural support for such loads.

Other known bed extenders are mounted directly to the vehicle frame and project rearwardly from the vehicle. Such extenders are difficult and time consuming to install, and are not readily removable to permit normal functioning of the load carrying bed of the vehicle. Still other bed extenders have a frame which can be inserted in a box receiver hitch located on the vehicle. The frame projects rearwardly to support the rearward end of a load projecting outward from the rear of the vehicle. While this bed extender is simple to install and remove, it requires that the vehicle have a box receiver hitch, and also accumulates the weight of the rearward end of the extended length load and directs it to the box receiver hitch.

BRIEF DESCRIPTION

In accordance with one aspect, a bed extender assembly for a vehicle bed comprises at least one bed extender device having a longitudinal length greater than a length of the vehicle bed. The at least one bed extender device has a first end disposed in the vehicle bed and a second end spaced apart from the first end to define the longitudinal length. The second end is spaced rearwardly apart from a rearward end of the vehicle bed. A locking bar extends transversely across the vehicle bed adjacent the first end to lock the first end of the at least one bed extender device against the bed floor.

In accordance with another aspect, a vehicle bed extender assembly comprises at least one bed extender track. The at least one bed extender track is cantilevered from a vehicle bed for supporting a wheeled vehicle when said wheeled vehicle has a length greater than a bed length of the vehicle bed. A locking bar supports a forward end of the at least one bed extender track to resist lifting of the forward end when the wheeled vehicle is supported by the at least one bed extender track.

In accordance with yet another aspect, a bed extender assembly for a short bed vehicle comprises first and second extender devices. The extender devices lay on and extend along a bed floor of the short bed vehicle with rearward end portions overhanging from an end of said bed floor. A transversely extending locking bar holds forward end portions of the first and second extender devices at fixed locations on the bed floor. The locking bar prevents lifting of the first and second extender devices when a load is carried by the first and second extender devices.

BRIEF DESCRIPTION OF THE DRAWINGS

FIG. 4 is an enlarged partial schematical top view of the bed extender assembly of FIG. 3.

FIG. 5 is a partial cross-sectional view of the bed extender assembly of FIG. 4 taken generally along line 5-5 of FIG. 4.

FIG. 7 is a partial cross-sectional view of the bed extender assembly of FIG. 4 taken generally along line 7-7 of FIG. 4 according to another exemplary embodiment.

FIG. 8 is a partial cross-sectional view of the bed extender assembly of FIG. 4 taken generally along line 8-8 of FIG. 4 according to yet another exemplary embodiment.

FIG. 10 is an enlarged partial view of the bed extender assembly of FIG. 5.

FIG. 11 is a side view of FIG. 10.

FIG. 12 is a cross-sectional view of a bed extender assembly according to yet another exemplary embodiment.

FIG. 13 is an enlarged partial view of the bed extender assembly of FIG. 12 taken generally along line 13-13 of FIG. 12.

FIG. 14 is an enlarged partial schematical top view of a bed extender assembly according to yet another exemplary embodiment.

FIG. 15 is a partial cross-sectional view of the bed extender assembly of FIG. 14 taken generally along line 15-15 of FIG. 14.

FIG. 16 is a partial cross-sectional view of the bed extender assembly of FIG. 14 in a retracted position.

DETAILED DESCRIPTION

Figure 1:
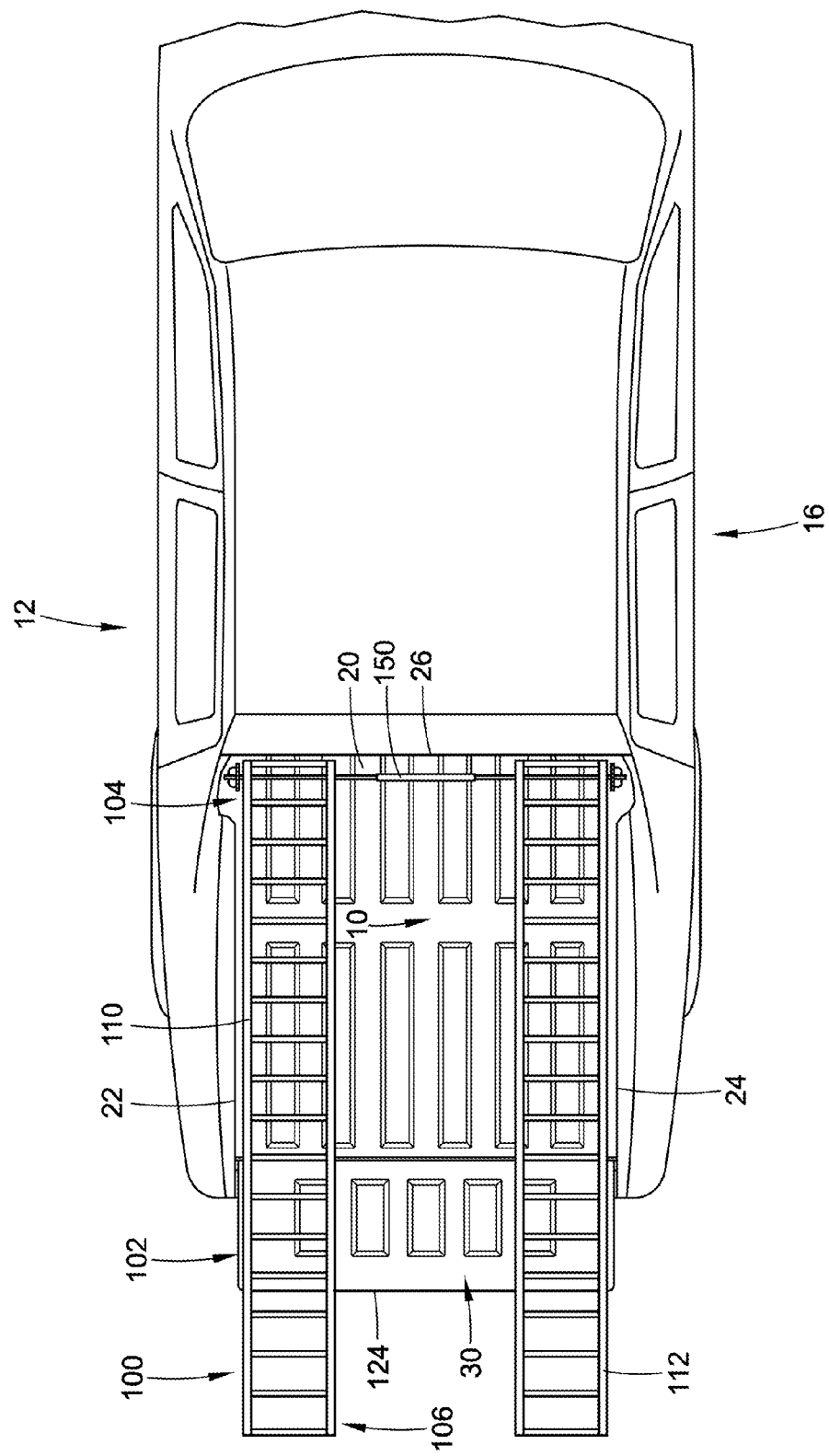
FIG. 1 is a schematical top view of a vehicle having an exemplary load-carrying bed and a bed extender assembly mounted therein.

It should, of course, be understood that the description and drawings herein are merely illustrative and that various modifications and changes can be made in the structures disclosed without departing from the present disclosure. It will also be appreciated that the various identified components of the bed extender assembly disclosed herein are merely terms of art that may vary from one vehicle manufacturer to another and should not be deemed to limit the present disclosure. All references to direction and position, unless otherwise indicated, refer to the orientation of the bed extender assembly illustrated in the drawings and should not be construed as limiting the claims appended hereto. Like numerals refer to like parts throughout the several views.

Referring now to the drawings wherein the showings are for purposes of illustrating one or more embodiments only and not for purposes of limiting the same, FIG. 1 illustrates an exemplary embodiment of a bed extender assembly 100 releasably mounted within a load-carrying bed or bed portion 10 of a vehicle 12, such as a pickup truck or similarly configured vehicle. As will be discussed in greater detail below, the bed extender assembly 100 addresses the problem of shorter vehicle beds not being long enough for loading larger items, such as larger types of all terrain vehicles (see the ATV 50 schematically illustrated in FIG. 2) and motorcycles.

The pickup truck 12 includes the load-carrying bed 10 and a cab portion 16 The load-carrying bed 10 can include one or more inner bed components that substantially define the primary cargo carrying compartment of the pickup truck bed.

Such inner bed components can include, for example, a bed floor 20, a left side member 22, a right side member 24, a forward wall or headboard member 26, and/or a portion of a tailgate 30. The side members 22, 24 and the headboard member 26 can extend upwardly from a location adjacent to at least a portion of the bed floor 20. The inner bed components can be formed from any number of materials, as for example, steel, aluminum, plastic, fiberglass, composites, and/or a combination thereof. It should be understood that the exemplary bed extender assembly 100 can be mounted to a substantially flat load-carrying bed that is unbounded by side walls and/or a tailgate, such as would be typical of a flat-bed type truck. Further, in the illustration of FIG. 1, the load-carrying bed 10 includes the tailgate 30; however, the load-carrying bed 10 might not include any such rear cargo restraint whatsoever.

The bed extender assembly 100 has a longitudinal length greater than a length of the vehicle bed 10. The bed extender assembly 100 comprises at least one bed extender device 102 having a first end section 104 disposed in the vehicle bed 10 and a second end section 106 spaced apart from the first end section 104 to define the longitudinal length. As shown, the first end section 104 is disposed adjacent the forward wall or headboard member 26 of the vehicle bed 10 and the second end section 106 is spaced rearwardly apart from a rearward end of the vehicle bed 10.

In the illustrated embodiments, the bed extender assembly 100 includes first and second track members 110 and 112, respectively, transversely spaced apart from one another. The track members 110, 112 are cantilevered from the vehicle load-carrying bed 10 for supporting a wheeled vehicle, such as the ATV 50 (FIG. 2), when the wheeled vehicle has a length greater than a bed length of the vehicle bed 10. The spacing between the first and second track members 110, 112 generally corresponds to a width between transversely spaced apart wheels 120 of the wheeled vehicle 50. It should be appreciated that the illustrated embodiment shows the bed extender assembly 100 having two track members 110 and 112, but only one track member could be used, such as when carrying a motorcycle.

Figure 2:
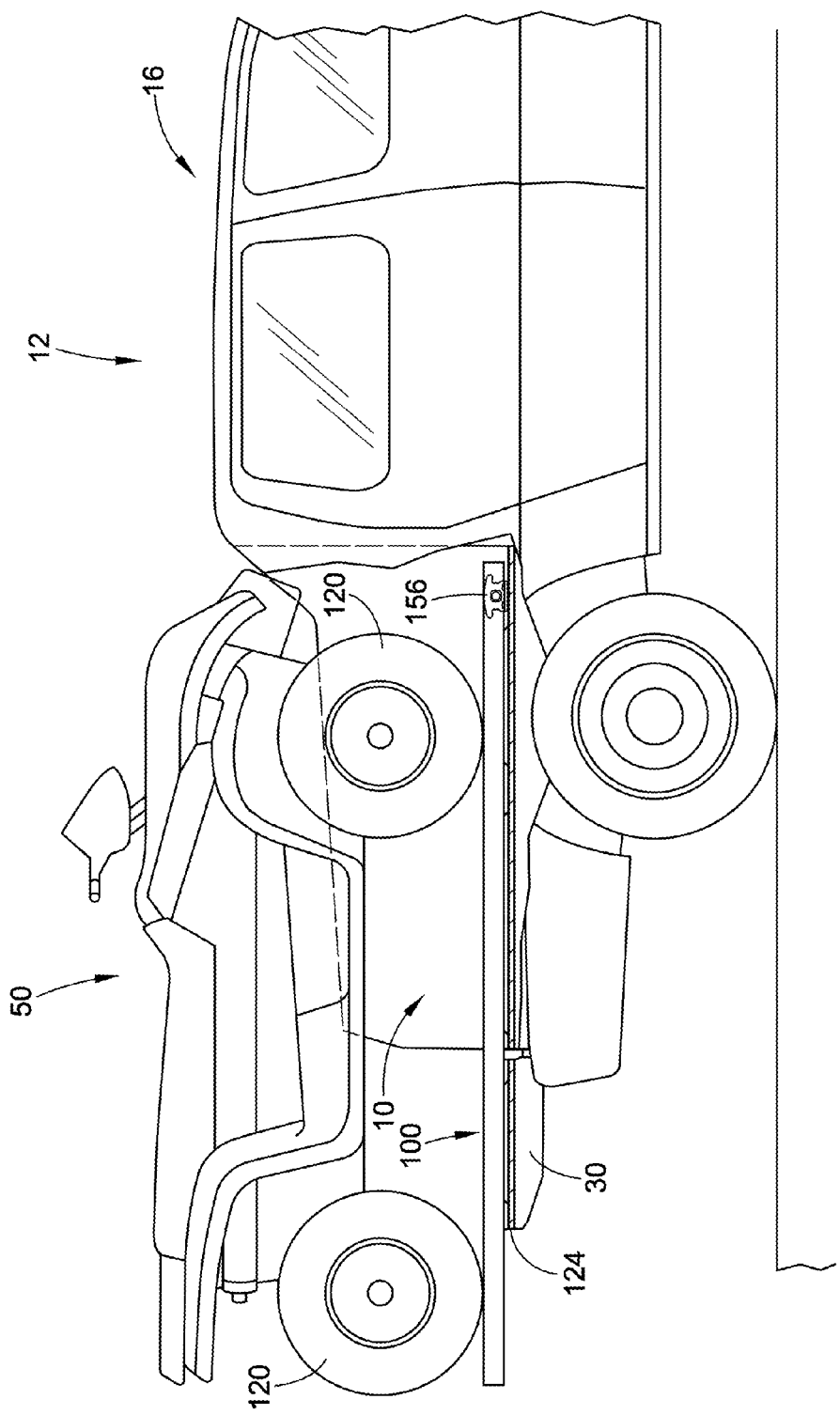
FIG. 2 is a schematical side view of the vehicle of FIG. 1 including a wheeled vehicle loaded on the bed extender assembly.

Returning to the illustrated embodiment, the first and second track members 110 and 112 overlay the load-carrying bed 10 and an inside surface of the tailgate 30 when in its opened position. The track members 110, 112 extend beyond a rear or distal edge 124 of the tailgate 30 when it is in its folded open position, thereby extending the effective length of the load-carrying bed 10 and tailgate 30. By way of example, FIG. 2 illustrates the first and second track members 110 and 112 allowing the wheeled vehicle 50 that is longer than the load-carrying bed 10, and longer than the load-carrying bed 10 and tailgate 30 combined, to be carried by the short bedded vehicle 12. The bed extender device 100 is configured to relieve the load or remove the load (or at least a portion thereof) of the wheeled vehicle 50 from the tailgate 30 and carry it on the first and second track members 110,112, which distribute the load across the vehicle bed 10 and the tailgate 30.

Figure 3:
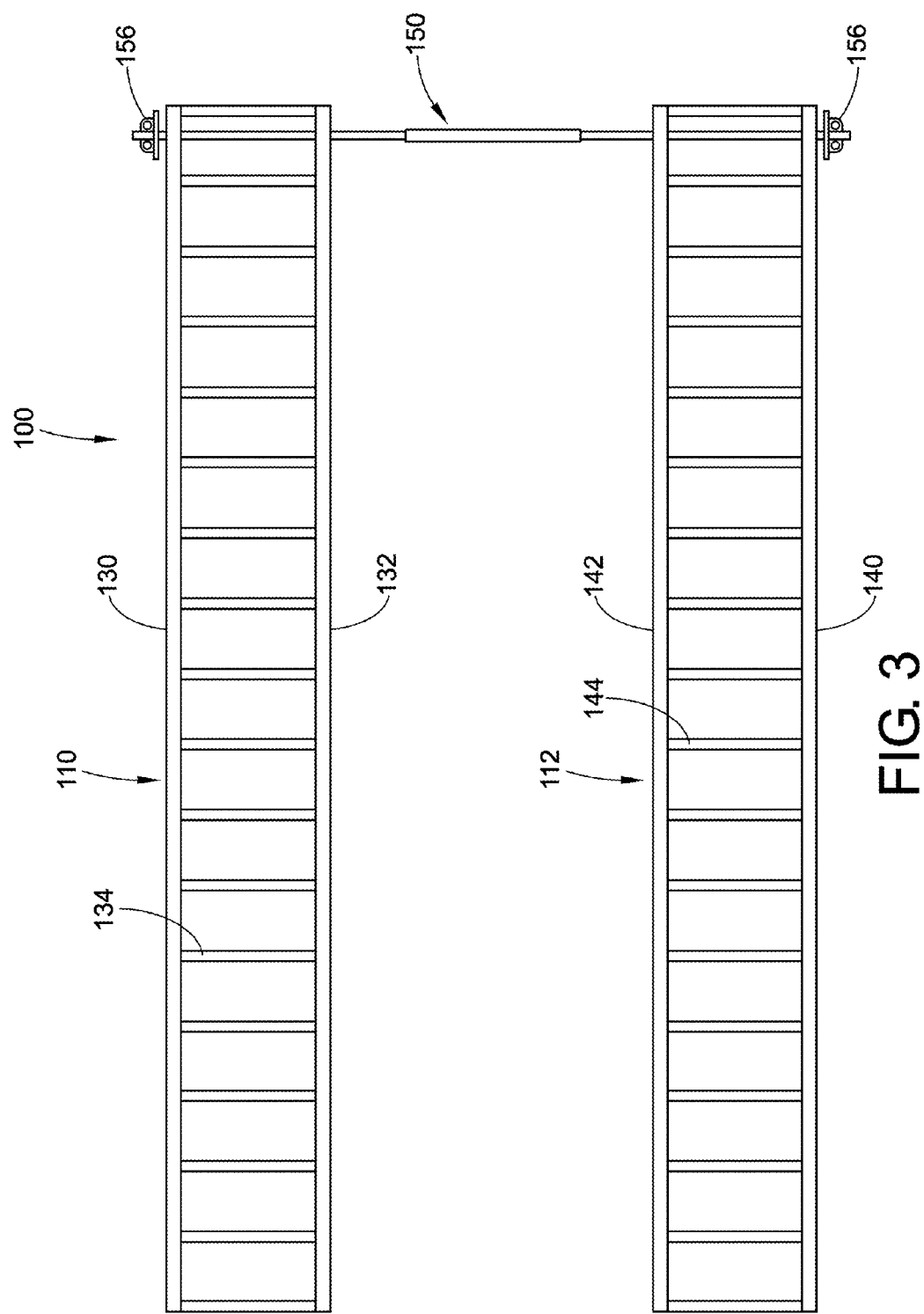
FIG. 3 is a schematical top view of the bed extender assembly of FIG. 1.

With reference to FIG. 3, the first track member 110 is generally ladder-shaped; although, this is not required. As shown, the first track member 110 includes first and second spaced apart longitudinal members 130 and 132, respectively, and a plurality of cross members 134 extending transversely between the first and second longitudinal members 130, 132. The cross members 134 are provided at uniform intervals between the first and second members 130,132; although, this is not required. Each of the first and second longitudinal members 130, 132 extend longitudinally from the first end section 104 to the second end section 106. The first and second members 130 and 132 are unitary members such that the first track member 110 has a fixed longitudinal length. Although, it should be appreciated that the first and second members 130, 132 can have other configurations. For example, in an alternative embodiment (not shown), the first and second members 130, 132 can be configured to be extendable such that the first track member 110 has a varying longitudinal length to accommodate various load-carrying bed sizes. In this example, each member 130 and 132 can include a first section which is releasably mounted adjacent the headboard member 26 and a separate second section. The second section can be telescopically received within the first section to vary the longitudinal length of the respective member 130 and 132. Returning to the illustrated embodiment, the second track member 112, which is a mirror image of the first track member 110, also includes first and second spaced apart longitudinal members 140 and 142, respectively, and a plurality of cross members 144 extending transversely between the first and second longitudinal members 140, 142.

Figure 9:
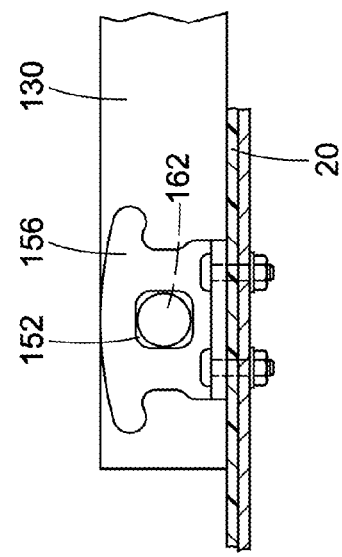
FIG. 9 is a partial cross-sectional view of the bed extender assembly of FIG. 4 taken generally along line 9-9 of FIG. 4.

With reference now to FIGS. 4,5 and 9, to secure the track members 110 and 112 within the vehicle bed 10, the bed extender assembly 100 includes a locking bar 150. The locking bar 150 is configured to hold down or retain a front portion of each of the first and second track members 110, 112 and lock into openings or slots 152 provided in spaced apart locking structures located on the vehicle 12, such as the existing vehicle bed tie downs 156 or similar mounting devices. The locking bar 150 extends transversely across the vehicle bed 10 adjacent the first end section 104 of the bed extender assembly 100 to lock the first end section 104 of the bed extender assembly 100 against the bed floor 10. This prevents against a lifting movement of the bed extender assembly 100 and counterbalances downward loading forces applied to the bed extender assembly 100, for example by the wheeled vehicle 50, adjacent the second end section 106 of the bed extender assembly 100.

Figure 6:
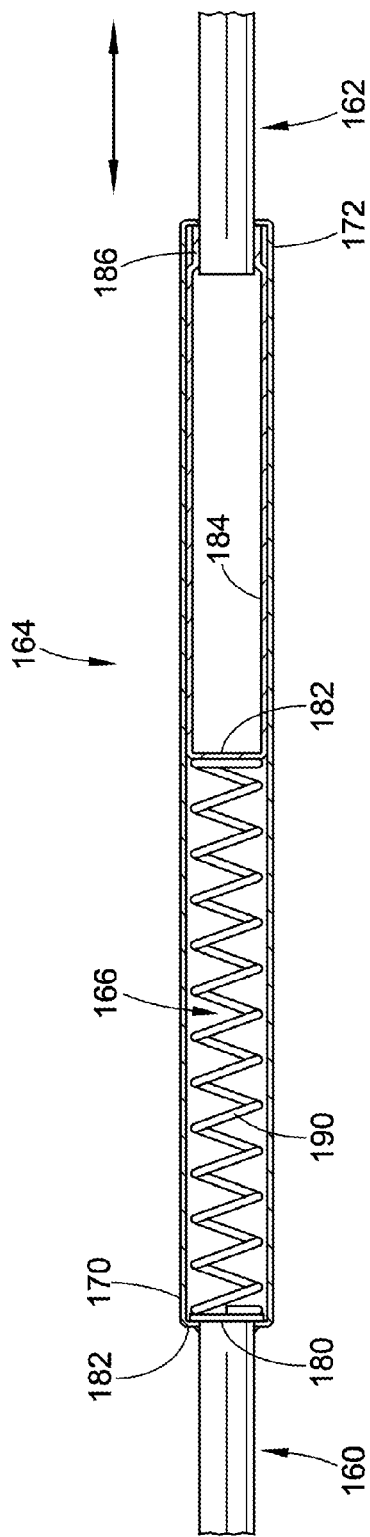
FIG. 6 is a partial cross-sectional view of the bed extender assembly of FIG. 4 taken generally along line 6-6 of FIG. 4 according to one exemplary embodiment.

The locking bar 150 of the illustrated embodiment includes a first flanking member 160, a second flanking member 162 and a centrally disposed outer member or sleeve 164 having an elongated receiving aperture 166 (FIG. 6) defined therein. As will be discussed in greater detail below, the sleeve 164 is configured to allow at least one of the first and second flanking members 160, 162 to be telescopically received with the elongated aperture 166. As shown in FIG. 6, in one exemplary embodiment, a first end section 170 of the sleeve 164 is fixedly attached to the first flanking member 160. Particularly, the first flanking member 160 includes flange 180 and the first end section 170 of the sleeve 164 includes a lip 182 for engaging the flange in the expanded position. This prevents separation of the first flanking member 160 from the sleeve 164. As shown in FIG. 7, in another exemplary embodiment, the first end section 170 of the sleeve 164 is integrally formed with the first flanking member 160. In the embodiments of FIGS. 6 and 7, the second flanking member 162 is at least partially slidingly received in a second end section 172 of the sleeve. As shown in FIG. 8, in yet another exemplary embodiment, the sleeve 164 is a separate member. The first flanking member 160 is at least partially received in the first end section 170 of the sleeve 164, and the second flanking member 162 is at least partially received in the second end section 172 of the sleeve 164. In the embodiment of FIG. 8, both the first and second flanking members 160, 162 are displaceable relative to the sleeve 164.

A bias mechanism 190 is positioned within the sleeve 164. In the depicted embodiments, the biasing mechanism 190 is a spring; although, this is not required. The bias mechanism 190 is compressed when the locking bar 150 is in a collapsed position and urges the locking bar 150 toward an expanded position. The bias mechanism 190 allows at least one of the first and second flanking members 160 and 162 to be telescopically received within the elongated aperture 166 of the sleeve 164 so as to flank the sleeve 164. This allows the locking member 150 to be moved between the expanded position wherein opposite ends of the locking bar 150 are cooperatively and removably received within the spaced apart tie downs 156 and the collapsed position wherein the opposite ends of the locking bar 150 are collapsed toward one another for removal from the tie downs 156.

In the depicted embodiment of FIG. 6, at least a portion of the second flanking member 162 is telescopically received within the sleeve 164. The bias mechanism 190 is positioned between the first flanking member 160 and a closed end 182 of a cup-like member 184, which is displaceable within the sleeve 164. An open end 186 of the cup-like member 184 registers with the second end section 172 of the sleeve 164. The cup-like member 184 is dimensioned to at least partially slidingly receive the second flanking member 162. As the second flanking member 162 engages the closed end 182 of the cup-like member 184, the cup-like member 184 together with the second flanking member 162 compresses the bias mechanism 190, thereby moving the locking bar 150 into the collapsed position. As indicated above, in this embodiment, the sleeve 164 is fixedly attached to the first flanking member 160.

In the depicted embodiment of FIG. 7, the first end section 170 of the sleeve 164 is integrally formed with the first flanking member 160. The bias mechanism 190 can be attached to the first end section 170 via conventional manners to prevent removal of the bias mechanism 190 from the sleeve 164. To assemble the locking bar 150, the second flanking member 162 is telescopically received within the elongated aperture 166 through the open second end section 172 of the sleeve 164. Engagement of the second flanking member 162 with the bias mechanism 190 compresses the bias mechanism 190 and moves the locking bar 150 into the collapsed position. In the depicted embodiment of FIG. 8, the sleeve 164 is a separate member and the bias mechanism 190 is centrally disposed within the elongated aperture 166 of the sleeve 164 between a first cup-like member 200 and a second cup-like member 202. The first and second cup-like members 200 and 202 are displaceable within the sleeve 164 and are dimensioned to at least partially slidingly receive the respective first and second flanking members 160 and 162. This allows both the first and second flanking members 160 and 162 to be telescopically received within the elongated aperture 166 of the sleeve 164.

With reference to FIGS. 4 and 5, to mount the locking bar 150 to the first and second track members 110, 112, the locking bar is received through apertures 220 and 222 located in the respective first and second longitudinal members 130 and 132 and apertures 224 and 226 located in the respective first and second longitudinal members 140 and 142. The respective apertures of the first and second members 130 and 132 are adjacent to the first end section 104 of the bed extender assembly 100 to allow the locking bar 150 to lock the first end section 104 against lifting movement. As shown in FIG. 9, opposite ends of the locking bar 150 cooperatively engage the tie downs 156 of the vehicle bed 10. The ties downs 156 are generally disposed adjacent the left and right side member 22 and 24 and adjacent the headboard member 26 of the vehicle load-carrying bed 10. The opposite ends of the locking bar 150 are respectively received through respective openings 152 located in looped portions of the tie downs 156. As shown in FIGS. 10 and 11, to limit movement of the locking bar 150 within the openings 152 of the tie downs 156, cotter pins 250 can be provided. To mount the cotter pins 250 to the locking bar 150, each end of the locking bar 150 can include a bore 252 dimensioned to receive the cotter pin 250. Each cotter pin 250 is positioned adjacent the tie down 156 opposite each first and second track member 110, 112. However, it should be appreciated that alternative manners for limiting movement of the locking bar 150 are contemplated.

For example, as shown in FIGS. 12 and 13, another exemplary embodiment of a bed extender assembly 100' is illustrated. In this exemplary embodiment, opposite ends of a locking bar 260 are generally stepped shaped to limit movement of the locking bar 260 within the openings 152 of the tie downs 156. Particularly, first and second flanking member 270 and 272 of the locking bar 260 are dimensioned slightly larger than the openings 152. To mount the locking bar 260 to the tie downs 156, end portions 280 and 282 of the first and second flanking member 270 and 272 have a reduced dimension for receipt within the openings 152 of the tie downs 156. Alternatively, a fixed pin having a reduced diameter for receipt within the openings 152 can be attached to the end portions 280, 282 of the flanking member 270, 272.

With reference to FIGS. 14-16, another exemplary embodiment of a bed extender assembly 100" is illustrated. Similar to the previous exemplary embodiments described above, the bed extender assembly 100" includes a locking bar 300. The locking bar 300 is configured to hold down or retain a front portion of each of the first and second track members 110, 112 and lock into the openings 152 provided in the spaced apart tie downs 156. Similar to locking bar 260, opposite ends 302, 304 of the locking bar 300 are generally stepped shaped to limit movement of the locking bar 300 within the openings 152 of the tie downs 156. Particularly, as shown, each end 302, 304 of the locking bar 300 includes a respective bore 310, 312 dimensioned to slidingly receive a retractable retaining pin 320. Although, it should be appreciated that one end of the locking bar 300 can have a fixed pin or reduced dimension, similar to locking bar 260. The retaining pin 320 includes a shaft 330 for engaging the tie down 156 and a finger 332 for limiting displacement of the shaft 330. The finger 332 of each retaining pin 320 is slidingly received in a generally L-shaped slot 340, 342 located on the respective ends 302, 304 of the locking bar 300. A bias member 350, such as the depicted spring, is located within each bore 310, 312 for urging the retaining pin 320 out of the bore. As shown in FIG. 15, in an extended position, the shafts 330 of the retaining pins 320 at least partially project outwardly from the ends 302, 304 of the locking bar 300 and are received within the openings 152 of the tie downs 156. The fingers 332 are positioned at one end of the L-shaped slots 340, 342. As shown in FIG. 16, in a retracted position, the fingers 332 are positioned at the other end of the L-shaped slots 340, 342 thereby locking the shafts 330 of the retaining pins 320 within the bores 310, 312.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:
1. A bed extender assembly for a vehicle bed, comprising:
at least one bed extender device having a longitudinal length greater than a length of the vehicle bed, said at least one bed extender device having a first end disposed in the vehicle bed and a second end spaced apart from said first end to define said longitudinal length, said second end spaced rearwardly apart from a rearward end of the vehicle bed; and a locking bar extending transversely across the vehicle bed adjacent said first end to lock said first end of said at least one bed extender device against the bed floor, wherein said at least one bed extender device includes first and second track members transversely spaced apart from one another for carrying a wheeled vehicle, each of said first and second track members having a longitudinal length greater than the length of the vehicle bed such that each track member projects beyond a rear edge of a tailgate with said tailgate in a folded open position, wherein each one of said first and second track members includes first and second spaced apart longitudinal members and a plurality of cross members extending transversely between said first and second longitudinal members, wherein said locking bar includes an outer member and first and second inner members extending from opposite ends of said outer member, said outer member being spaced from and positioned entirely between said first and second track members, said outer member including an outer sleeve, an inner sleeve slidably positioned within said outer sleeve and a bias mechanism for urging said inner sleeve toward one of the ends of said outer sleeve, one of said first and second inner members being telescopically received in said inner sleeve of said outer member and movable between an expanded position wherein said first and second inner members are received within spaced apart locking structures and a collapsed position wherein said one inner member together with said inner sleeve is displaced within said outer sleeve toward the other end of said outer sleeve and said first and second inner members are removable from said spaced apart locking structures, wherein each of said first and second track members includes at least one aperture extending transversely through one of the first and second longitudinal members, one of said first and second inner members being received through the at least one aperture of said first track member and the other of said first and second inner members being received through the at least one aperture of said second track member, said first and second inner members directly contacting said first and second track members and locking said first and second track members against lifting movement.

2. The bed extender assembly of claim 1 wherein said first end is disposed adjacent a forward wall of the vehicle bed.

3. The bed extender assembly of claim 1 wherein at least one bed extender device overlays a bed floor of the vehicle bed and an inside surface of a folded open tailgate of the vehicle bed, said second end spaced rearwardly apart from a distal edge of said folded open tailgate.

4. The bed extender assembly of claim 1 wherein said locking bar locks said first end of said at least one bed extender device against lifting movement and counterbalances downward loading forces applied to said at least one bed extender device adjacent said second end.

5. The bed extender assembly of claim 1 wherein each of said first and second longitudinal members extends longitudinally from said first end to said second end.

6. The bed extender assembly of claim 1 wherein opposite ends of said locking bar cooperatively engage tie downs of the vehicle bed, the ties downs disposed adjacent side walls of the vehicle bed and adjacent a forward wall of the vehicle bed.

7. The bed extender assembly of claim 6 wherein said opposite ends of said locking bar are respectively received through respective apertures of said tie downs.

8. The bed extender assembly of claim 1 wherein said bias mechanism urges said locking bar toward said expanded position.

9. The bed extender assembly of claim 8 wherein said bias mechanism is a coiled spring that is compressed when said locking bar is in said collapsed position and urges said locking bar toward said expanded position.

10. A vehicle bed extender assembly, comprising:

a bed extender device including at least one track member cantilevered from a vehicle bed for supporting a wheeled vehicle when said wheeled vehicle has a length greater than a bed length of said vehicle bed, said at least one track member has a longitudinal length greater than said bed length, said at least one track member includes a first track member and a second track member, the first and second track members spaced apart from one another for supporting wheels of said wheeled vehicle, each of said first and second track members having first and second spaced apart longitudinal members and a plurality of cross members extending transversely between said first and second longitudinal members, each end portion of the first and second longitudinal members including an aperture which extends transversely through the end portion; and a locking bar for securing said first and second track members in the vehicle bed and supporting a forward end of each of said first and second track members to resist lifting of said forward end when said wheeled vehicle is supported by said first and second track members, said locking bar extending transversely across said vehicle bed through said apertures adjacent a forward wall of said vehicle bed, said locking bar having an expanded position and a collapsed position, wherein said locking bar includes a central member disposed entirely between said first and second track members and first and second flanking members, said first and second flanking members extending from respective first and second ends of said central member, said central member including an outer sleeve, a generally cup-shaped inner sleeve displaceable within said outer sleeve and a bias mechanism for urging said inner sleeve toward said first end of said central member and said locking bar toward the expanded position, said inner sleeve having a closed end and an open end, said first flanking member being telescopically received in said open end of said inner sleeve of said central member for engaging said closed end and sliding said inner sleeve within said outer sleeve toward said second end of said central member, said inner sleeve compressing said bias mechanism thereby moving said locking bar to the collapsed position, said flanking members being received through said apertures defined in said first and second track members, distal ends of said flanking members releasably received within looped portions of vehicle bed tie down devices.

11. The vehicle bed extender assembly of claim 10 wherein said at least one bed extender track projects beyond a rear edge of a tailgate with said tailgate in a folded open position.

* * * * *